United States Patent Office 3,381,334
Patented May 7, 1968

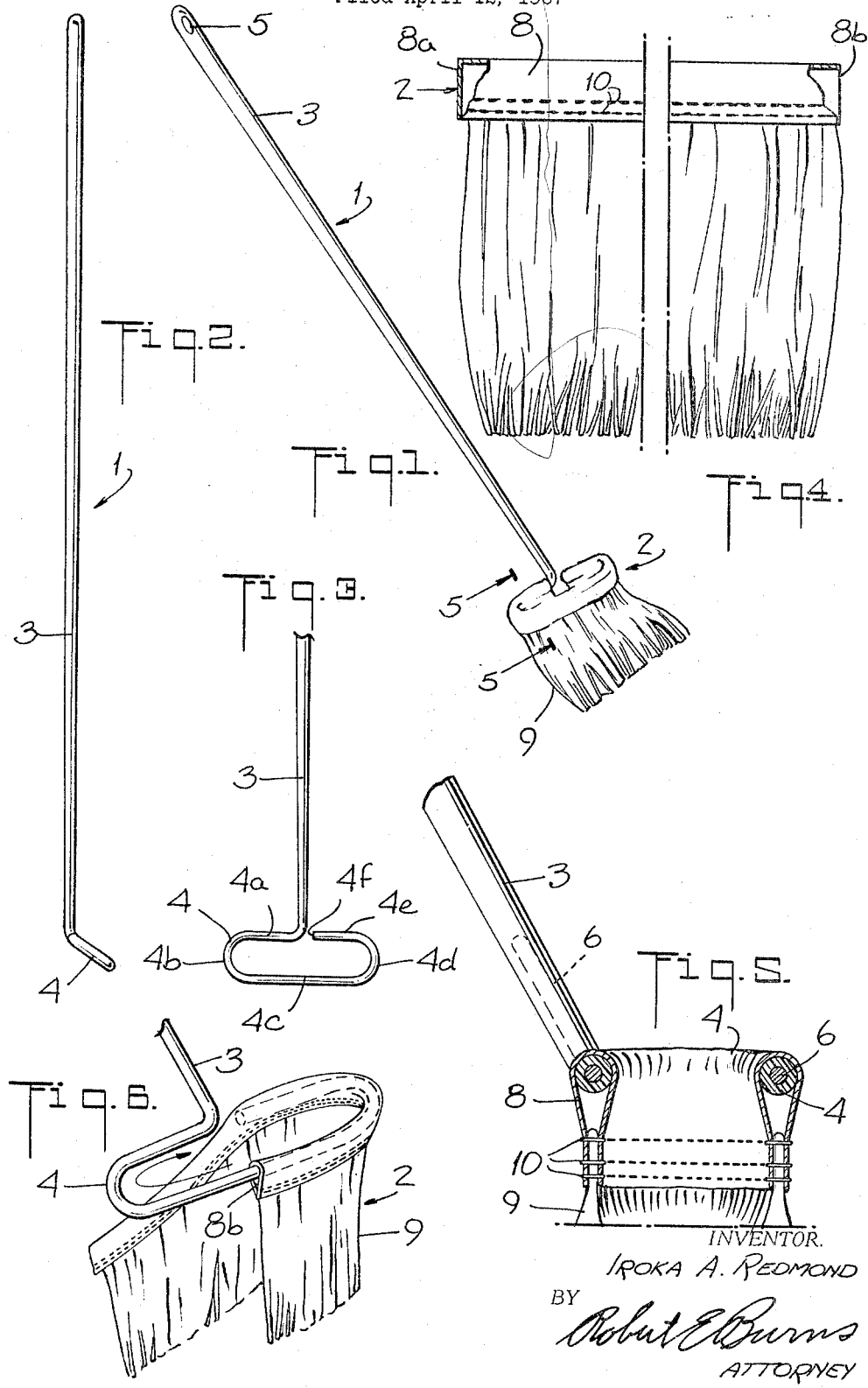

3,381,334
HOUSEHOLD CLEANING IMPLEMENT
Iroka A. Redmond, 128 4th St.,
Garden City, N.Y. 11530
Filed Apr. 12, 1967, Ser. No. 630,290
6 Claims. (Cl. 15—229)

ABSTRACT OF THE DISCLOSURE

A household cleaning implement comprises a straight elongated handle portion and an integral holder portion in the form of a loop disposed in a plane at an angle of about 30° to 60° to the handle portion and having a free end spaced from the handle portion to provide a small gap. A mop having a tubular portion and a dependent fringe portion is removably assembled on the holder portion by slipping the tubular marginal portion of the mop over the free end of the holder portion and drawing it around the loop to the opposite side of the handle portion.

---

The invention relates to a cleaning implement suitable for household use.

In the care of a home there are many small cleaning jobs for which an ordinary mop is too large and clumsy for convenient use, and a dust cloth or dish cloth is inadequate. For example, it may be desired to clean small floor areas in front of the sink, stove or refrigerator when something has dropped or spilled, or in front of a door when children have tracked in. There are also many places which cannot conveniently be reached for cleaning or dusting with a cloth, for example, under radiators or furniture, behind stoves and over doors and windows. Dust or cobwebs must sometimes be removed from the ceiling, light fixtures and the grills of exhaust fans or ventilators. These are only a few of many small cleaning jobs around the house for which no satisfactory implement is presently available.

It is an object of the present invention to provide a cleaning implement which is ideally suited for small cleaning jobs such as those mentioned above. Not only is the cleaning implement of the present invention convenient and effective to use, but it has the further advantage of being easy to store, since it will fit into a small closet space or in a cupboard or compartment, for example under the sink. It is usable either dry, for example for dusting, or wet, for example for wiping or mopping. It is completely sanitary and easy to take care of. Moreover, it is so inexpensive that a housewife can afford to have several around the house so that one is always close at hand.

The nature and advantages of the cleaning implement in accordance with the invention will be understood from the following description of a preferred embodiment shown by way of example in the accompanying drawings, in which:

FIG. 1 is a perspective view of a cleaning implement in accordance with the invention, including a handle and mop portion;

FIG. 2 is a side view of the handle only;

FIG. 3 is a front view of the lower portion only of the handle;

FIG. 4 is an enlarged view of the mop portion with portions broken away;

FIG. 5 is a partial sectional view taken approximately on the line 5—5 in FIG. 1, and FIG. 6 is a partial perspective view illustrating how the mop portion is assembled on the handle.

The cleaning implement of the present invention as illustrated in the drawings comprises only two parts, namely a handle 1 and a mop 2.

The handle 1 comprises a handle portion 3 adapted to be held by the user and an integral holder portion 4 adapted to receive the mop 2. The handle portion 3 is straight and of any desired cross sectional shape, for example round, oval or polygonal. It is preferably tapered as seen in FIGS. 1 and 2, being of larger cross section near the upper end, and gradually tapering downwardly until it is the same cross sectional size as the holder portion 4. A hole 5 is provided near the upper end of the handle portion for convenience in hanging the implement on a suitable hook or other support.

The integral holder portion 4 is in the form of a flattened loop comprising a first straight portion 4a, which projects laterally from the lower end of the handle portion 3, a first semi-circular portion 4b, a second straight portion 4c which is approximately parallel to the first straight portion 4a and approximately twice as long, a second semi-circular portion 4d which is opposite the first semi-circular portion 4d, and a third straight portion 4e which is approximately in line with the first straight portion 4a and has a free end 4f which is adjacent to but spaced from the lower end of the handle portion 3, so as to leave a small gap. As seen in FIG. 2, the loop-shaped holder portion 4 is disposed at a substantial angle to the handle portion 3, for example at an angle of about 30° to 60° and preferably about 45°. The length along the major axis of the loop is considerably greater than the width along the minor axis, being for example between two and four times as great. The cross section of the holder portion 4 is preferably constant throughout the circumferential extent of the loop and is materially smaller than the maximum cross sectional size of the handle portion 3. When the handle is tapered as illustrated in FIGS. 1 and 2 the cross sectional size of the holder portion 4 corresponds to that of the lower end of the handle portion 3.

The handle 1 comprising the handle portion 3 and holder portion 4 is preferably formed of plastic material having suitable characteristics of strength, weight, durability and appearance. The holder portion 4 and lower part of the handle portion 3 may, if desired, be suitably reinforced, for example by glass fibers or by a rod, wire or cord 6, which is molded in the plastic. While plastic is preferred by reasons of cost, durability, appearance and ease of manufacture, the handle may be made of other materials, for example metal either alone or in combination with wood or plastic.

For convenience in use for the intended purposes, the handle is preferably about 2 to 3 feet long and the holder portion 4 has a length (along the major axis of the loop) of the order of 6 to 9 inches. The cross sectional dimension of the upper portion of the handle is of a size which can be conveniently held in the hand for example with a transverse dimension of about ⅝ inch to ⅞ inch. The cross section of the holder portion 4 preferably has a transverse dimension of about ¼ inch to ½ inch. However, it will be understood that these dimensions are given by way of example and are subject to reasonable variation.

The mop 2 is made of flexible absorbent material, for example cotton, and comprises a tubular marginal portion 8 and a dependent portion 9. As illustrated in the drawings, the dependent portion 9 is formed of fringe material, for example a multiplicity of cotton cords. The tubular marginal portion 8 is conveniently formed of strip material which is folded double along its longitudinal center line. The fringe material forming the depending portion 9 is received between opposite edge portions of the folded strip and secured to the strip for example by multiple stitching 10. Cords forming the fringe portion 9 are conveniently doubled with the doubled end received between opposite edges of the strip material forming the tubular portion 8. One end 8a of the tubular portion 8 is preferably closed, as illustrated in FIG. 4 while the other end 8b is open.

The tubular portion 8 is of a size to slip freely over the holder portion 4 of the handle so that the holder is received inside the marginal portion 8, as illustrated in FIG. 5. The length of the marginal portion 8 when the mop is straightened out corresponds to the circumferential extent of the loop-shaped holder portion 4. The dependent portion 9 of the mop is of any desired length (in a direction extending down from the marginal portion 8) depending on the intended use of the implement. For example, cords forming the fringe may have a length of 4 to 8 inches.

The mop 2 is conveniently assembled on the handle by slipping the open end 8b of the marginal portion 8 over the free end 4f of the holder portion 4, and then drawing it around the loop as illustrated in FIG. 6 until the end 8b abuts the lower end of the handle portion 3. The closed end 8a of the tubular portion 8 prevents the mop from going too far. It is found that when the mop and handle are properly designed, the tubular marginal portion 8 of the mop grips the holder portion 4 sufficiently that the mop is retained on the holder by friction, so that no additional securing means is needed. However, when it is desired to remove the mop from the handle, this is easily done by merely slipping it off over the free end 4f of the loop-shaped holder. The mop is thus easily removed for cleaning and replacement. Since it has no metal parts, it can be washed in a washing machine and dried in a dryer without damage either to the mop or the machines. If the mop becomes worn out it is readily replaced by another mop, while retaining the same handle. Moreover, several different mops may be used interchangeably on the same handle. For example, one mop may be intended to be used wet, for example in cleaning the floor, while another may be intended to be used dry, for example for dusting, and may be treated with suitable oils, waxes or other materials.

It will be seen that by reason of its size, shape and construction, the cleaning implement in accordance with the present invention is very convenient to use for a multiplicity of purposes. For example, the mop is ideal for cleaning the interior of closets, high shelves and wood or tile moldings. The mop is used dry on such surfaces as wood or paper and wet on tile. It is also useful on small boats or in cabanas at the beach. The angular disposition of the loop-shaped holder portion 4 is of importance in making it easy to use the mop effectively and conveniently in different positions. The elongated loop-shape of the holder portion 4 in conjunction with its angular position on the handle is also an important factor in the convenience and effectiveness of the implement. The small overall size of the implement makes it possible to store the implement in a cupboard or other small space when it is not in use.

The easy removability of the mop from the handle facilitates washing and drying. It is small enough to be washed by hand and can be pulled out straight to dry quickly. By virtue of its construction it can readily be pinned on a clothesline. When the mop is washed and dried immediately after use, the unpleasant odors usually associated with wet mops are avoided.

While a preferred embodiment of the invention had been illustrated in the drawing and herein particularly described it will be understood that the invention is in no way limited to this particular embodiment.

What I claim is:

1. A cleaning implement comprising a handle having a straight elongate handle portion having a length of the order of two to three feet, said handle having at its lower end an integral continuation shaped to form a loop shape holder portion comprising a first straight portion projecting radially from the lower end of said elongate handle portion and joined therewith by a small radius curve, a first semi-circular portion, a second straight portion of approximately twice the length of said first straight portion and approximately parallel to said first straight portion, a second semi-circular portion disposed opposite to said first semi-circular portion and a third straight portion approximately in line with said first straight portion and terminating adjacent to but spaced from said small radius curve to leave a small gap, said loop shaped holder portion having an over all length of the order of six to nine inches and extending laterally of said elongate handle portion at an angle of about 30° to 60° thereto, said loop shaped holder portion having a cross sectional diameter of the order of one-quarter to one-half inch and said elongate handle portion having a cross sectional diameter of the order of five-eighths to seven-eighths inch, the lower part of said elongate handle portion tapering in cross section to approximately the cross section of said loop shape holder portion, and mop means of flexible absorbent material having a flexible linear tubular marginal portion open at one end and a dependent portion, said tubular marginal portion being of a size to receive said holder portion and having a length approximately equal to the circumferential length of said loop shaped holder portion, said mop means being removably assembly with said handle by inserting said open end of said tubular marginal portion through said gap and slipping it over said free end of said loop shape holder portion and drawing said marginal portion around said loop until said open end is adjacent the lower end of said elongate handle portion.

2. A cleaning implement according to claim 1, in which said loop shaped holder portion is disposed in a plane at an angle of about 45° to said elongate handle portion.

3. A cleaning implement according to claim 1, in which said elongate handle portion and loop shape holder portion comprise a single plastic molding.

4. A cleaning implement according to claim 3, in which the lower part of said elongate handle portion has reinforcement elements molded in the plastic.

5. A cleaning implement according to claim 1, in which said dependent portion of said mop means comprises fringe material and said marginal portion comprises flexible strip material folded on itself along its longitudinal center line and having opposite edge portions embracing and secured to said fringe material.

6. A cleaning implement according to claim 4, in which said fringe material comprises a multiplicity of strands.

References Cited

UNITED STATES PATENTS

| | | | |
|---|---|---|---|
| 1,414,036 | 4/1922 | Meinhardt | 15—229 |
| 1,515,494 | 11/1924 | Knox | 15—229 XR |
| 1,768,695 | 7/1930 | Knox | 15—229 |
| 1,781,460 | 11/1930 | Hertzberg | 15—229 |
| 2,009,728 | 7/1935 | Buell | 15—120 |
| 2,194,214 | 3/1940 | Arioli | 15—229 XR |
| 2,720,672 | 10/1955 | Marchetti | 15—229 |
| 2,782,441 | 2/1957 | Lipton | 15—229 |
| 3,213,475 | 10/1965 | Shirley | 15—143 XR |
| 3,221,354 | 12/1965 | Noyes | 15—244 XR |

FOREIGN PATENTS

| | | |
|---|---|---|
| 773,173 | 8/1934 | France. |
| 249,012 | 3/1926 | Great Britain. |

DANIEL BLUM, *Primary Examiner.*